Oct. 14, 1969    M. MUELLER ET AL    3,472,403
APPARATUS FOR HANDLING CONTAINERS
Filed Sept. 26, 1967    5 Sheets-Sheet 1

INVENTOR:
Martin Mueller
Carl Byrd
BY Dressler, Goldsmith, Clement & Gordon
ATTORNEYS

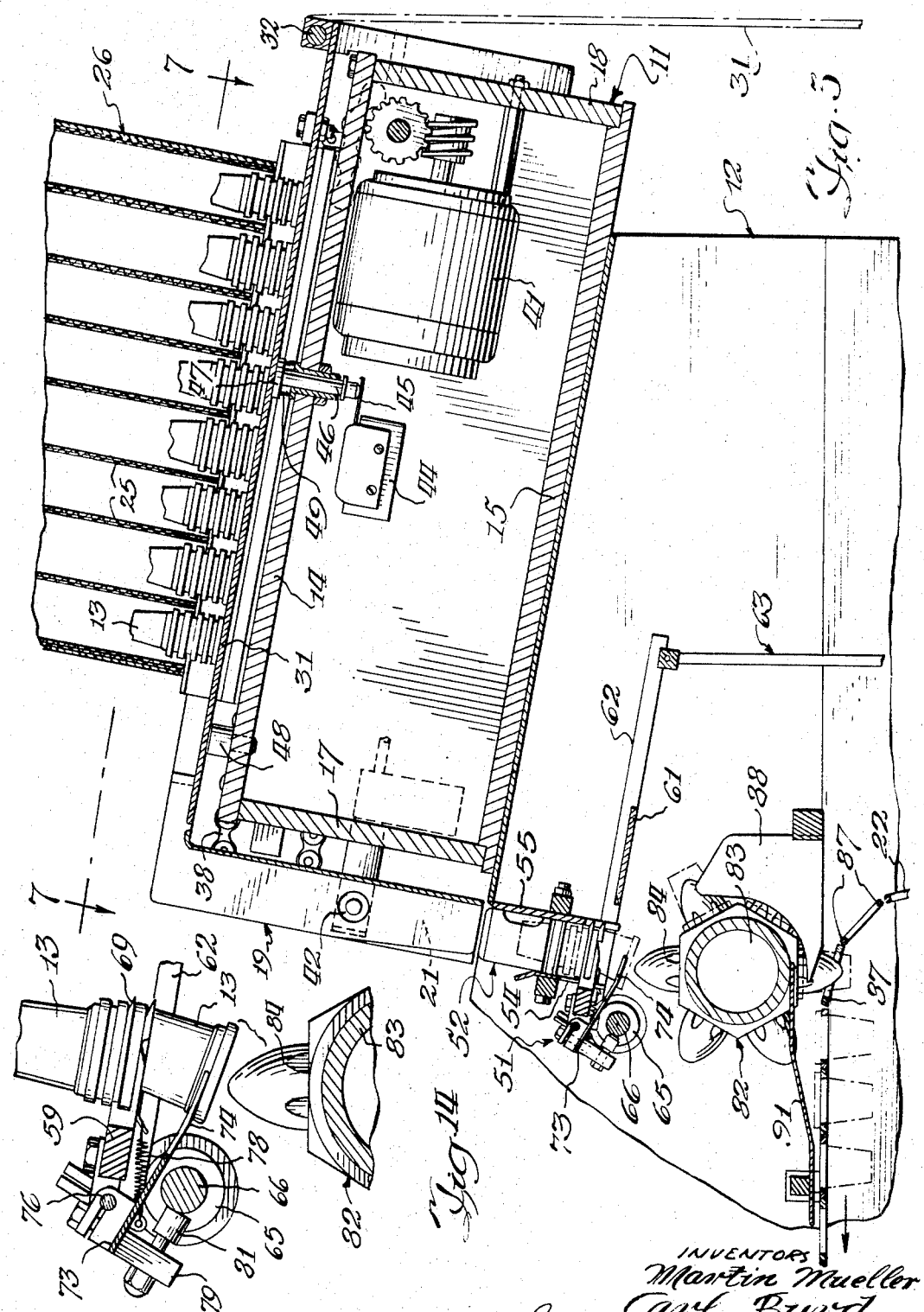

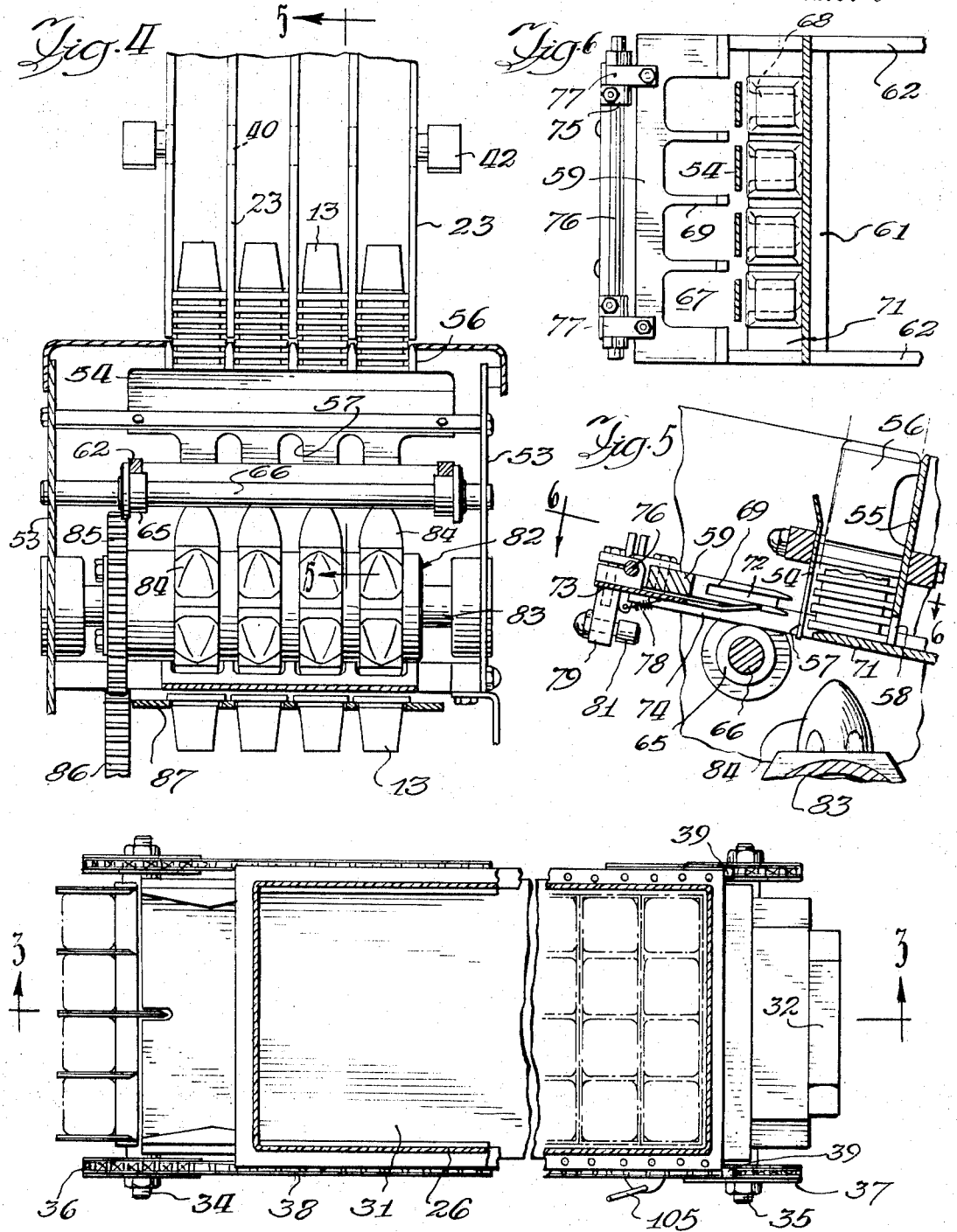

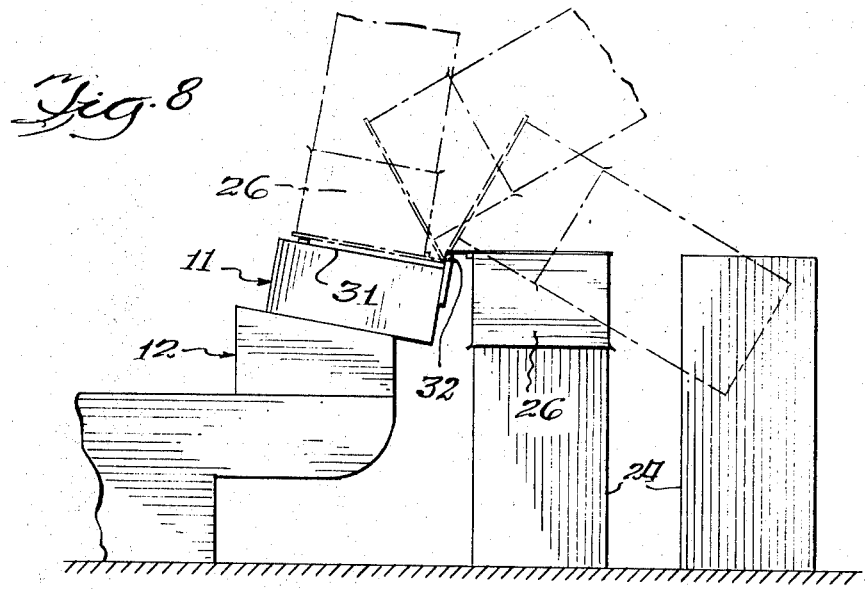
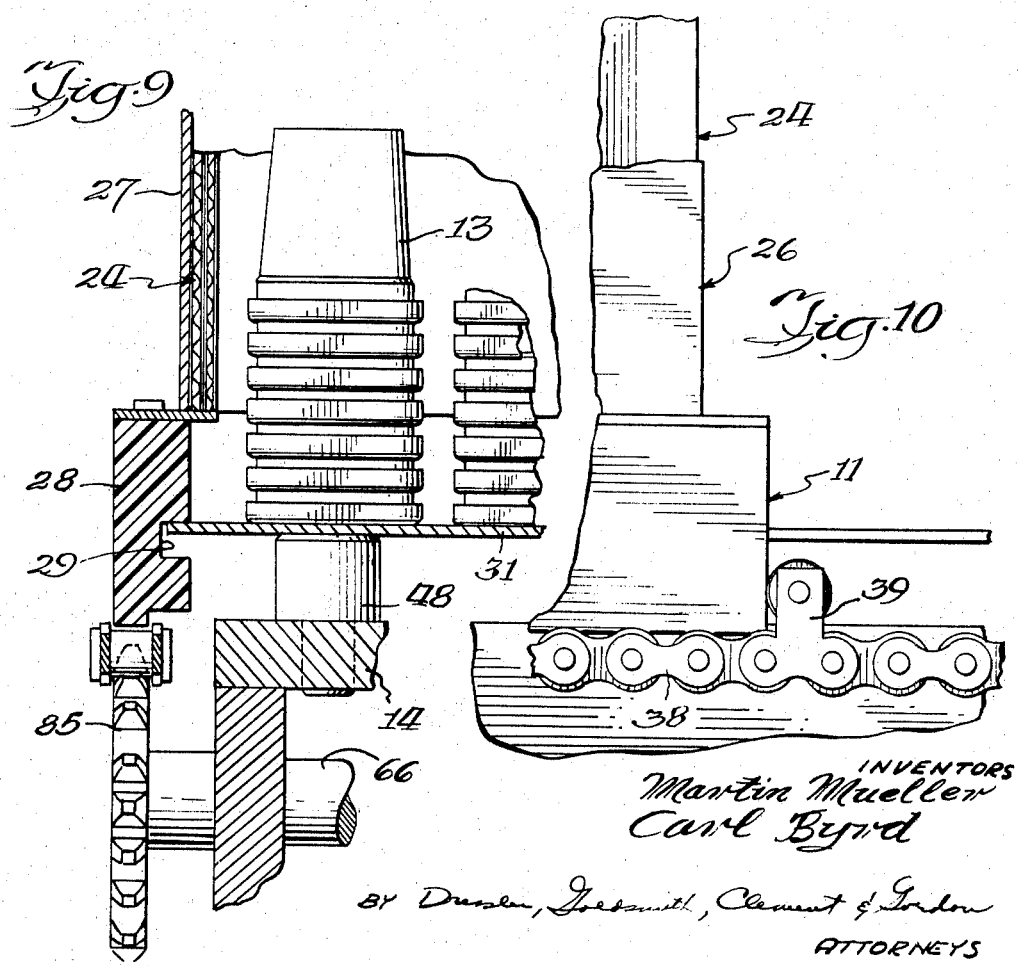

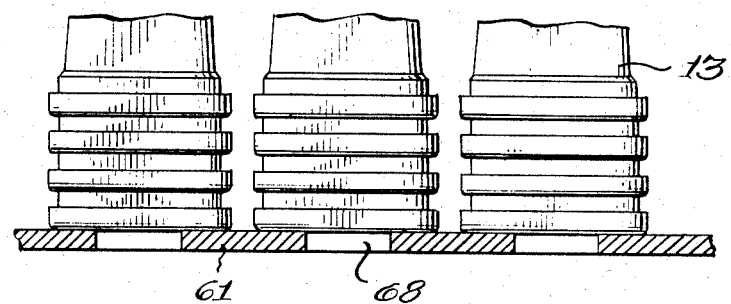
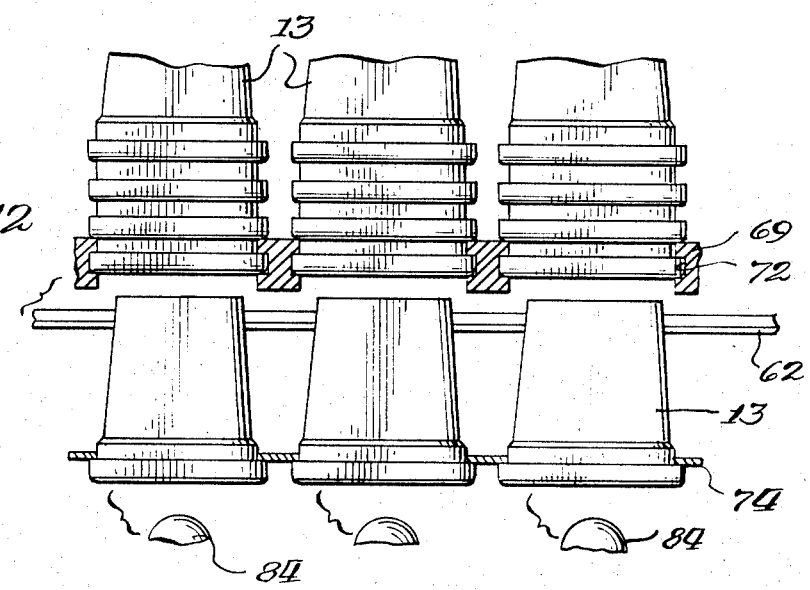
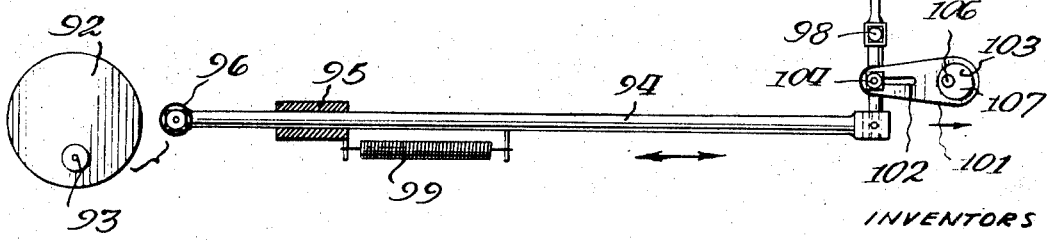

United States Patent Office 3,472,403
Patented Oct. 14, 1969

3,472,403
APPARATUS FOR HANDLING CONTAINERS
Martin Mueller and Carl Byrd, Chicago, Ill., assignors, by mesne assignments, to Owens-Illinois, Inc., Toledo, Ohio, a corporation of Ohio
Filed Sept. 26, 1967, Ser. No. 670,543
Int. Cl. B65b 21/02; B65g 65/04
U.S. Cl. 214—307    13 Claims

ABSTRACT OF THE DISCLOSURE

The apparatus includes a frame for supporting a carton containing a supply of cups and a passage at one end of the frame. A row of stacks of cups is held in the passage and supported on a separator member. A motor reciprocates the separator member to remove the lowermost cup of each stack of cups in the passage simultaneously, and also rotates a transfer member that receives the cups from the separator member and positions them on a conveyor in position for filling. An electric eye in the passage senses the absence of cups in the passage and energizes another motor to move the carton so as to cause more cups to drop into the passage and thus maintain a constant supply of cups.

---

In previous devices designed for simultaneously filling a plurality of individual cups, the time and labor required for positioning the cups on the conveyor that carries them to the filling station has always been a considerable cost item. The apparatus of the present invention eliminates substantially all of the labor and much of the time heretofore required for moving the cups from the supply area to the filling station.

In accordance with the present invention, means for automatically replenishing the stacks of cups in a passageway between the cup carton and a conveyor on which the cups are to be placed have been provided so that substantially no manual handling of the cups is necessary. As the stacks of cups in the passageway are depleted, an electric eye senses the absence of cups before the stacks are completely gone, and starts a motor. The motor moves an open ended carton containing stacks of cups across the top of the passageway so that cups aligned vertically with the stacks of cups in the passageway drop on them to build up the stacks. The cups added to the stacks of cups in the passageway break the beam of the electric eye and stop the motor.

The bottom cup in each stack is removed by a separator member which acts to retain the balance of the stacks in the passageway.

A second motor that is operated continuously reciprocates the separator member, rotates a shaft that is part of a transfer member, and drives a conveyor belt on which the cups are to be placed for filling. The separator member functions to deposit the cups on studs forming part of the transfer member. The transfer member is rotated, and when the cups have been rotated through 180°, they are engaged by a stripper plate that removes each cup from its stud, and then forces it into an individual aperture in the conveyor belt.

Suitable structure by means of which the above mentioned and other advantages of the invention are attained is fully described in the following specification, taken in conjunction with the accompanying drawings showing a preferred embodiment of the invention, in which:

FIGURE 3 is a longitudinal sectional view, taken in the plane indicated by the line 3—3 of FIGURE 7;

FIGURE 4 is a fragmentary front elevational view of the apparatus with portions broken away;

FIGURE 5 is a fragmentary cross-sectional view, taken in the plane indicated by the line 5—5 of FIGURE 4;

FIGURE 6 is a fragmentary longitudinal sectional view, taken in the plane indicated by the line 6—6 of FIGURE 5;

FIGURE 7 is a fragmentary cross-sectional view, taken generally in the plane indicated by the line 7—7 of FIGURE 3;

FIGURE 8 is a fragmentary diagrammatic view, showing the method of mounting a carton on the frame;

FIGURE 9 is a fragmentary sectional view showing the carton and holder mounted on the frame;

FIGURE 10 is a fragmentary elevational view showing the chain for moving the holder and carton longitudinally of the frame;

FIGURE 11 is a fragmentary cross-sectional view through one part of the separating member supporting a plurality of stacks of nester containers;

FIGURE 12 is a fragmentary cross-sectional view through a different part of the separating member with the lowermost container of each stack removed from the stack for placement on the inverting member;

FIGURE 13 is a fragmentary elevational view of the linkage for reciprocating the separator member; and FIGURE 14 is an enlarged fragmentary sectional view of a portion of FIGURE 3 showing the separator member.

Figure 1:
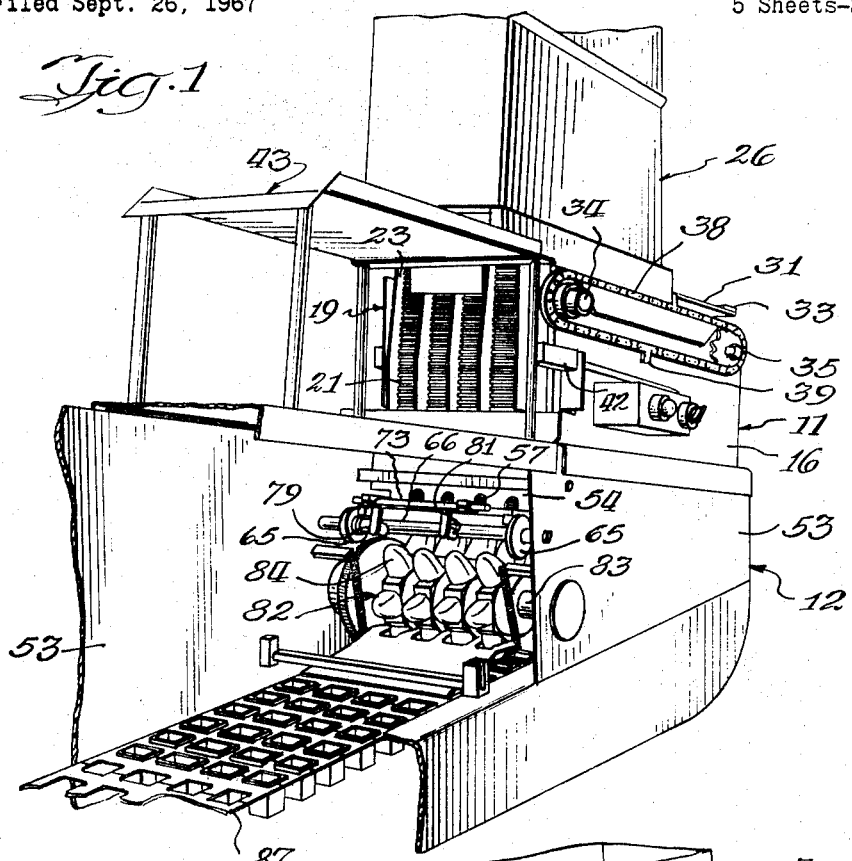
FIGURE 1 is a fragmentary perspective view of an apparatus embodying the invention, with portions broken away to illustrate the structure.
Figure 2:
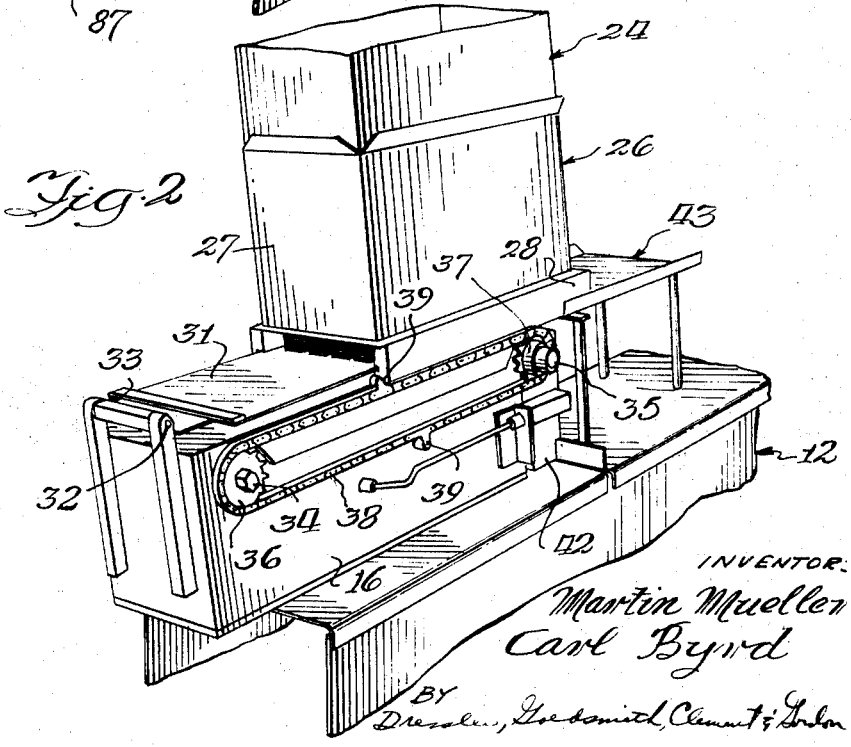
FIGURE 2 is a fragmentary perspective view of the apparatus looking at one side and the rear end of the apparatus.

Referring to the drawings, and particularly to FIGURES 1 to 3, to box-like frame 11 is seated on a base member 12 to support a supply of cups 13, or similar containers. The frame 11 comprises a top wall 14, bottom wall 15, sidewall 16, and end walls 17 and 18. For convenience, the end walls 17 and 18 will be identified as the front and back walls, respectively. An upper guide member 19 positioned forwardly of the front wall 17 defines the upper portion of a passage 21 for the cups intermediate the supply and a conveyor 22 that carries the cups to a filling station. The passage 21 is divided into a plurality of channels by partitions 23 so that the stacks of cups are separated from each other.

The supply of cups is packed in cartons 24, and the interior of each carton is preferably divided into individual compartments by partitions 25 extending longitudinally and transversely of the carton. One end of the carton is opened, and a holding frame 26 is secured to the carton adjacent its open end. The holding frame comprises a rectangular tubular member 27 adapted to fit around the sidewalls of the carton and a pair of longitudinal side rails 28 having oppositely disposed longitudinally extending grooves 29, as shown in FIGURE 9. The grooves permit the holding frame, and the carton 24 to which it is secured, to be slidably mounted on a panel 31. The panel 31 covers the open end of the carton 24 and has one end hinged adjacent the upper rear edge of the frame 11, as indicated at 32. After the holding frame 26 is secured to the carton, the panel 31 is swung counterclockwise about its pivot 32, as shown in FIGURE 8, to permit the holding frame and carton to be positioned with the outer longitudinal edges of the panel 31 seated in the grooves 29. The holding frame and carton are then slid longitudinally of the panel until the frame abuts a stop member 33 and the holding frame and carton are then lifted, together with the panel, about the pivot 32 to place the carton on top of the frame 11.

The sidewalls 16 of the frame provide bearing supports for a pair of shafts 34 and 35 that project through the sidewalls to support sprockets 36 and 37. The sprockets 36 and 37 carry an endless chain 38 having two lugs 39 projecting vertically therefrom in uniformly spaced relationship. The chain is located underneath the side rails 28 of the holding frame 26, which project laterally outwardly beyond the sidewalls 16 so that the lugs 39 can engage the ends of the rails to move the holding frame and carton when the chains are driven.

The chains 38 are driven by a motor 41 that is energized by a sensing device 42. The sensing device is preferably in the form of an electric eye located so that its beam traverses the passage 21 intermediate its height. When an ample supply of cups is in the passage 21, the beam of the electric eye is broken by the cups, and the motor 41 remains shut off. As the cups are removed individually from the bottom of each stack, in a manner hereinafter described, the height of each stack is decreased until the cups do not break the beam. The partitions 23 that extend vertically through the passage 21 are apertured, as indicated at 40, FIGURE 4, so as to allow the beam to pass through when the stacks of cups are not high enough to break the beam. Therefore, as soon as the height of the stacks of cups in the passage 21 is lowered to a predetermined height, the electric eye senses the absence of cups in the passage and energizes the motor to replenish the supply of cups.

When the motor is energized, it drives the chain 38 and the lugs 39 engage the rear ends of both side rails 28 simultaneously to move the carton 24 longitudinally of the panel 31 and over the open top of the passage 21. When the lugs 39 push the carton a distance equal to the depth of a stack of cups, the front row of stacks of cups in the carton clear of the panel 31 are in vertical alignment with the open top of the passage 21. The cups in the front row drop on to the stacks of cups in the passage and build them up so that they break the beam of the electric eye and stop the motor.

As the carton is intermittently moved forwardly, its front end is supported by a tray 43 mounted on top of the base 12 forwardly of the passage 21. When the last row of stacks of cups is dropped from the carton into the passage 21, the empty carton and its holding frame 26 are clear of the panel 31, and the previously idle pair of lugs 39 are in a position wherein they will not interfere with the positioning of another carton containing a new supply of cups. In order to place a carton containing a new supply of cups in proper position for replenishing the stacks of cups in the passage 21, it is necessary to swing the panel 31 about its pivot, slide the holding frame, with a carton positioned therein, on the panel, and then swing the panel, with the holding frame and carton engaged therewith, to place the carton with its open end on top of the panel.

In order to maintain a constant supply of cups in the passage 21, it is necessary to position the new carton on the frame before the stacks of cups in the passage 21 are completely depleted. If the motor 41 continues to operate, the lugs 39 will move into position where they will interfere with positioning the holding frame 26 on the frame 11, and it will be necessary to wait until the lugs are moved out of the way. It is preferred to stop the motor 41 as soon as the carton is emptied, to allow the new carton to be properly positioned on the frame 11 while the lugs 39 are held out of the way.

A switch 44, shown in FIGURE 3, deenergizes the electric eye to prevent operation of the motor 41 as shoon as a carton 24 is pushed past the outer end of the panel 31. The switch 44 is biased toward open position, in which position it holds the electric eye mechanism deenergized. A blade 45 projects outwardly from the switch approximately parallel to the top wall 14 of the frame 11. A plunger 46 projects through the wall 14 with its enlarged upper end 47 engaged by the underside of the panel 31 when the panel is parallel to the wall 14. Studs 48 project upwardly to support the outer end of the panel. A spring 49 biased between the wall 14 and the upper end of the plunger 46 urges the plunger upwardly. The force of the spring 49 is slightly greater than the downward force exerted by the weight of the panel 31 on the plunger. When any portion of a carton and its holding frame rests on the panel 31, the added weight is enough to hold the plunger 46 in its depressed position. In its depressed position, the plunger holds the blade 45 down to keep the switch 44 closed, and the operation of the motor 41 is controlled through the electric eye 42. When a carton and its holding frame are moved clear of the panel 31, the spring 49 moves the plunger 46 upwardly, and the switch 44 is opened to deenergize the electric eye so that the motor 41 cannot operate.

In order to permit a separator member 51, hereinafter described, to remove the lowermost cup from each stack of cups in the passage 21, a lower guide member 52 is secured to the sidewalls 53 of the base member 12. The lower guide member 52 is located adjacent the bottom of the upper guide member 19 and is aligned therewith to define the lower end of the passage 21. The guide member 52 comprises a pair of vertical transversely extending plates 54 and 55, and the space between them is divided into compartments by vertical partitions 56 which are aligned with partitions 23, as shown in FIGURES 4 and 5. The lower edges of the plates 54 and 55 are notched, as indicated at 57 and 58, respectively, for cooperation with the separator member as hereinafter described.

The separator member 51 comprises two transversely extending plates 59 and 61 rigidly interconnected in spaced relationship by longitudinally extending bars 62 pivotally connected at one end to a linkage 63, as indicated at 64. The ends of the bars 62 remote from the pivotal connection 64 are supported on rollers 65 that are mounted on a shaft 66. The shaft 66 has its ends journaled in the sidewalls 53 of the base member 12. The plate 59 is secured to the top of the bars 62, and the plate 61 is secured to the bottom of the bars 62, to provide a vertical offset between the plates. The plates 59 and 61 are notched on their adjacent edges, as indicated at 67 and 68, respectively. The notches 67 define relatively narrow fingers 69 projecting from one edge of the plate 59, and the notches 68 define relatively wide fingers 71 projecting from the adjacent edge of the plate 61. The vertical offset between the fingers 69 and 71 is equal to the distance between the upper rims of two adjacent nested cups 13.

The separator member 51 is reciprocated longitudinally of the apparatus by the linkage 63, as hereinafter described, to move the plates 59 and 61 alternately into and out of vertical alignment with the passage 21. The notches 58 extending upwardly from the lower edge of the plate 55 are wide enough to receive the fingers 71 and permit the plate 61 to be moved under the passage 21. When the plate 61 is under the passage 21, it supports all the stacks of cups in the passage. The notches 57 are wide enough to receive the fingers 69 and permit them to move into vertical alignment with the passage 21.

The fingers 69 are grooved longitudinally on both sides, as indicated at 72. When the plate 59 is moved to the right, as viewed in FIGURE 3, its vertical offset causes the grooves 72 to engage opposite sides of the rim of the next to the lowermost cup in each of the stacks of cups in the passage 21 and the lowermost cup is not supported. The frictional engagement of the lowermost cup of the stack with the cup in which it is nested makes it necessary to provide positive means for removing the lowermost cup from the stack before the member 51 is moved to the left to position the plate 61 under the passage 21.

The means for removing the lowermost cup from each stack includes a plate 73 and fingers 74 projecting from one edge of the plate. The fingers 74 are of substantially the same width as the fingers 69 with which they are aligned. The plate 73 is pivotally mounted relative to the outer edge of the plate 59. Clamping members 75 that are rigidly secured to the plate 73 are clamped tightly to a rod 76 spaced from the outer edge of the plate 59. The rod 76 is journaled in a pair of lugs 77 that extend from the outer edge of the plate 59. A pair of springs 78 at opposite ends of the plate 73 urge the plate into juxtaposition with the underside of the plate 59.

A pair of lugs 79 depend from the underside of the plate 73 each outwardly of the pivot rod 76. Each of the lugs 79 carries an abutment member 81 adjacent the side of the lug 79 closest to the fingers 74. The movement of the separator member to the right, as viewed in FIGURE 3, causes the abutment members 81 to strike the shaft 66. When the abutment members 81 engage the shaft 66, any force exerting a pull to the right on the separator member 51 moves the fingers 74 downwardly about the pivot 76. The downward pivotal movement of the fingers 74 exerts a positive force against the lowermost cup 13 of each of the stacks of cups to simultaneously remove the lowermost cups from the stacks.

As each cup is removed from its stack, it is engaged by a transfer member 82. The cups are stacked upside down in the passage 21, and are inverted by the transfer member as they are placed on a conveyor in position for filling. The cups are filled as the conveyor carries them past a filling mechanism. The transfer member 82 comprises a shaft 83 having a plurality of studs 84 projecting from its peripheral surface. The studs are arranged in rows, and the spacing between the studs of each row is the same as the spacing between the stacks of cups in the passage 21. A gear 85 that is fixed to the shaft 83 is meshed with a driven gear 86, and is continuously driven thereby in a clockwise direction, as viewed in FIGURE 3.

The gear 86 is driven by any suitable motor (not shown) and drives a conveyor belt 87 that is apertured to receive the cups 13 from the transfer member 82. As the fingers 74 remove the lowermost cup 13 from each stack of cups, each cup drops on to one of the studs 84. Each stud carries its cup through 180° to invert it as the shaft 83 rotates. A guide 88, comprising a plurality of vertically disposed partitions, engages the lips of the cups to retain each cup on its stud 84 until it is vertically aligned with one of the apertures 89 of the conveyor belt 87. At this point, the upper lip of each cup is engaged by a stripper member 91 which is shaped to guide the cup downwardly until its lip engages the conveyor belt 87 so that the cup is firmly engaged in the aperture.

In order to insure separation of the cups by the separator member at properly timed intervals corresponding with the positioning of the studs 84 under the separator member, the linkage 63 is actuated by a cam 92 eccentrically mounted on a shaft 93 that is driven by the same motor that drives the conveyor belt 87 and the shaft 83 of the transfer member. A link 94 that is slidably mounted in a sleeve 95 has a cam follower 96 secured to one end, and has its other end connected to a second link 97. The link 97 is pivoted intermediate its length, as indicated at 98. When the cam 92 engages the follower 96 and moves it to the right, as viewed in FIGURE 13, the link 97 moves about the pivot 98 and pushes the bar 62 to the left, thereby moving the plate 61 under the passage 21. This movement carries the fingers 69 out of engagement with the cups and causes the stacks of cups to drop on to the plate 61. When rotation of the cam 92 disengages the cam from the follower, a spring 99 moves the link 94 in the opposite direction. The movement positions the fingers 69 and 74 between the lips of the two lower cups of each stack and then separates the lowermost cup from each stack.

When it is desired to end a run on the apparatus, it is desirable to fill all the cups that have been positioned on the conveyor belt 87 without allowing any additional cups to drop from the passage 21. This is accomplished by clutching the linkage 63 so that the separator member 51 is locked against movement. The clutch mechanism, shown in FIGURE 13, comprises a plate 101 having a slot 102 adjacent one end, and a circular aperture 103 adjacent its opposite end. A pin 104 projecting from the link 97 in spaced relationship to its pivot 98 extends through the slot 102. A handle 105, shown in FIGURE 7, has a shaft 106 fixed in eccentric relationship to a disk 107 rotatably mounted in the aperture 103. The position of the shaft 106 is fixed relative to the base member 12.

The handle 105 (FIGURE 7) is turned manually to rotate the disk 107 about its shaft 106 as a pivot, and rotation of the disk moves the plate 101 relative to the pin 104. The slot 102 permits reciprocation of the link 94 when the pin 104 is positioned in the middle of the slot, but the link 94 cannot be reciprocated when the pin is at one end of the slot, as shown in FIGURE 13. When the link 94 is held against reciprocation, the separator member 51 remains stationary, and no cups are moved out of the passage 21.

What is claimed is:

1. An apparatus for continuously feeding cups to a conveyor, including means for supporting a supply of cups, a passage intermediate said supply and said conveyor through which said cups pass, means in said passage for sensing the absence of cups therein, means responsive to said sensing means to provide additional cups in said passage, and separator means adjacent the bottom of said passage for supporting a plurality of stacks of cups in said passage and for simultaneously removing the lowermost cup of each of said stacks while continuing to support said stacks of cups, said separator means comprising two plates interconnected in spaced relationship adjacent the bottom of said passage and motor driven linkage for reciprocating said plates to move them alternately into and out of vertical alignment with said passage, one of said plates supporting a plurality of stacks of cups in said passage when in vertical alignment with said passage, and said other plate being offset vertically from said first mentioned plate to support the cups above the lowermost cup in each of said stacks when in vertical alignment with said passage, said separator means further comprising a third plate pivoted adjacent the outer edge of said second mentioned plate and spring means urging said third plate into engagement with the underside of said second mentioned plate, said third plate engaging the upper portion of the lowermost cup of each stack when said second mentioned plate supports the cups above the lowermost cup of each stack, and means for moving said third plate downwardly about its pivot to remove the lowermost cup of each of said stacks while said second mentioned plate supports the cups above the lowermost cup of each stack.

2. An apparatus as recited in claim 1 in which said last mentioned means comprises a rod extending parallel to the pivotal axis of said third place below said axis and a stop member depending from said third plate, said stop member engaging said rod to move said third plate against the action of said spring means when said second mentioned plate is moved into vertical alignment with said passage.

3. An apparatus for continuously feeding cups to a conveyor, including means for supporting a supply of cups, a passage intermediate said supply and said conveyor through which said cups pass, means in said passage for sensing the absence of cups therein, means responsive to said sensing means to provide additional cups in said passage, separator means adjacent the bottom of said passage for supporting a plurality of stacks of cups in said passage and for simultaneously removing the lowermost cup of each of said stacks while continuing to support said stacks of cups, said conveyor being located below said separator means and said conveyor having apertures to receive said cups, transfer means intermediate said separator means and said conveyor for receiving the cups removed from said stacks and placing them on said conveyor in position to be filled, said transfer means comprising a rotatable shaft having studs projecting outwardly from its peripheral surface and means for rotating said shaft, each of said studs engaging a cup and inverting it while carrying it to said conveyor, and means for stripping said cups from said studs and forcing them into said apertures.

4. An apparatus for continuously feeding cups to a conveyor, including means for supporting a supply of cups, a passage intermediate said supply and said conveyor through which said cups pass, means in said passage for sensing the absence of cups therein, means responsive to said sensing means to provide additional cups in said passage, said last mentioned means comprising conveyor means engageable with said supply of cups to move the cups into vertical alignment with said passage and a motor energized by said sensing means to drive said conveyor means, said supply of cups being stacked in a carton having its lower end open, said first mentioned means including a panel extending under the open lower end of said carton and terminating short of said passage, whereby stacks of cups drop into said passage as said carton is moved past the top of said passage, and motor controlling means including a switch biased to open position in which it deenergizes said sensing means, switch actuating means including a spring pressed plunger having its top engaged by said panel, the force of said plunger spring being slightly greater than the downward force exerted by the weight of said panel on top of said plunger, whereby said plunger allows said switch to remain open when no additional weight is on said panel and holds said switch closed when any portion of said carton rests on said panel.

5. An apparatus for continuously feeding cups to a conveyor, including means for supporting a supply of cups, a passage intermediate said supply and said conveyor through which said cups pass, means in said passage for sensing the absence of cups therein, means responsive to said sensing means to provide additional cups in said passage, said last mentioned means comprising conveyor means engageable with said supply of cups to move the cups into vertical alignment with said passage and a motor energized by said sensing means to drive said conveyor means, said supply of cups being stacked in a carton having its lower end open, and said first mentioned means including a panel extending under the open lower end of said carton and terminating short of said passage, whereby stacks of cups drop into said passage as said carton is moved past the top of said passage, said first mentioned means further including a holding frame mounted on said carton adjacent its open end, said holding frame having a pair of oppositely disposed grooves engageable with opposite edges of said panel whereby said carton is slidable longitudinally of said panel.

6. Container handling apparatus comprising: a conveyor; means for supporting a supply of transversely extending rows of stacks of nested containers above said conveyor; passage means intermediate said supply and said conveyor for receiving said stacks of containers; means for shifting said supply to move said rows into alignment with said passage, so that the stacks of containers of said rows fall by gravity into said passage; means for simultaneously removing the containers one at a time from said stacks of containers within said passage; and means responsive to the presence of a given number of containers within said passage for terminating the shifting of said supply when more than the given number of containers is present and for initiating the shifting of said supply when less than the given number of containers is present.

7. Apparatus as set forth in claim 6 including means guiding said supply of containers for rectilinear movement toward said passage.

8. Apparatus as set forth in claim 6 wherein said supply of containers includes a cubic shipping carton having said stacks therein.

9. Apparatus as set forth in claim 6 in which said stacks are arranged with the containers facing downwardly, and wherein a rotary inversion mechanism is positioned below said passage and above said conveyor for inverting said containers and transferring them to said conveyor.

10. Container handling apparatus comprising: means defining a passage for receiving a plurality of transversely aligned stacks of nested, downwardly facing containers having an enlarged bead around the lower end thereof; and means for simultaneously removing the lowermost container from each stack while supporting the containers thereabove, said last named means including first and second plates spaced vertically from one another, means for alternately moving said first and second plates into alignment with said passage, said first plate having means for supporting said stacks of containers and said second plate having means for supporting the stack of containers above the lowermost container in each stack, and means responsive to movement of said second plate into alignment with said passage for positively displacing the lowermost container in each stack from said passage.

11. Apparatus as set forth in claim 10 wherein the means on said second plate includes a plurality of transversely spaced fingers adapted to be positioned between each stack of containers, said fingers each having longitudinally extending grooves therein for receiving the bead on the second lowermost container in each stack for supporting the containers thereabove.

12. Apparatus as set forth in claim 10 wherein the means for positively displacing the lowermost container in each stack includes a stop fixed relative to said passage, a third plate mounted for pivotal movement relative to said second plate, and an abutment on said third plate movable into engagement with said stop when said second plate moves into alignment with said passage for pivoting said third plate, said third plate including transversely spaced fingers engageable with the enlarged bead of the lowermost container in each stack for dislodging the lowermost containers from their respective stacks in response to pivotal movement of said third member.

13. The method of providing a plurality of transversely extending rows of upwardly facing containers on a conveyor comprising: (1) providing a supply of transversely extending rows of stacks of nested, downwardly facing containers; (2) shifting a first of said rows into alignment with a passage, so that the stacks of containers of said row fall by gravity into said passage; (3) supporting said stacks within said passage; (4) simultaneously removing the lowermost container from each stack in said row of stacks, while supporting the containers thereabove; (5) simultaneously inverting each of the removed containers; (6) simultaneously depositing the removed and inverted containers on said conveyor; (7) repeating steps 4–6 until a given number of containers has been depleted from each stack; and (8) indexing said supply of containers to place a second row of stacks in alignment with said passage to replenish the supply of containers within said passage.

References Cited
UNITED STATES PATENTS

| | | | |
|---|---|---|---|
| 1,028,458 | 6/1912 | Hassmann | 221—221 X |
| 2,304,437 | 12/1942 | Bell. | |
| 2,164,285 | 6/1939 | Schultz | 198—25 |
| 3,077,287 | 2/1963 | White | 221—11 X |
| 3,120,324 | 2/1964 | Amberg et al. | 221—11 X |

HUGO O. SCHULZ, Primary Examiner

U.S. Cl. X.R.

221—11, 221, 224, 297